(12) United States Patent
Achkinazi et al.

(10) Patent No.: US 12,513,209 B2
(45) Date of Patent: Dec. 30, 2025

(54) NVMe OVER TCP CONNECTION PERFORMANCE OPTIMIZATION ON HIGH LATENCY NETWORKS

(71) Applicant: Dell Products L.P., Round Rock, TX (US)

(72) Inventors: Igor Achkinazi, Northboro, MA (US); Lev Knopov, Brookline, MA (US); Erik Smith, Douglas, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/417,366

(22) Filed: Jan. 19, 2024

(65) Prior Publication Data

US 2025/0240348 A1    Jul. 24, 2025

(51) Int. Cl.
*G06F 15/16* (2006.01)
*H04L 67/1097* (2022.01)

(52) U.S. Cl.
CPC ............... *H04L 67/1097* (2013.01)

(58) Field of Classification Search
CPC .................. H04L 67/14; H04L 67/1097
See application file for complete search history.

(56) References Cited

U.S. PATENT DOCUMENTS

| | | | |
|---|---|---|---|
| 2014/0325013 A1* | 10/2014 | Tamir | G06F 3/0655 709/212 |
| 2022/0100712 A1* | 3/2022 | Nuttle | G06F 16/164 |
| 2022/0229604 A1* | 7/2022 | Black | G06F 3/0665 |
| 2022/0236916 A1* | 7/2022 | Esaka | G06F 3/0604 |

* cited by examiner

*Primary Examiner* — Yves Dalencourt
(74) *Attorney, Agent, or Firm* — Daly, Crowley, Mofford & Durkee, LLP

(57) ABSTRACT

A method for use by a computing device, comprising: receiving a bulk request for namespace information, the bulk request being a Non-Volatile Memory Express (NVMe) command that contains a Controller and Namespace Structure (CNS) code, the CNS code being arranged to indicate that the namespace information for multiple namespaces should be returned in response to the bulk request; identifying a plurality of namespaces, the plurality of namespaces being identified based on an offset value and a length value that are provided in the bulk request; transmitting a bulk request response that contains namespace descriptors for each of the plurality of namespaces.

11 Claims, 8 Drawing Sheets

NVMe OVER TCP CONNECTION PERFORMANCE OPTIMIZATION ON HIGH LATENCY NETWORKS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use by a computing device, comprising: identifying a transmission control protocol (TCP) window size of the computing device; identifying a plurality of namespaces based on the TCP window size, wherein identifying the plurality of namespaces includes identifying as many namespaces as possible, but no more, whose information can be requested in a same TCP window; transmitting, from the computing device to a storage system, a plurality of requests for information associated with the plurality of namespaces, wherein each of the plurality of requests for information is transmitted without waiting for an acknowledgment to be received for any other one of the plurality of requests; receiving, at the computing device, a plurality of responses to the requests for namespace descriptors, the plurality of responses including a different respective response to each of the plurality of requests; processing the plurality of responses, wherein processing the plurality of responses includes at least one creating a different respective block device for each of the plurality of namespaces and/or mounting a different data volume that corresponds to each of the plurality of namespaces.

According to aspects of the disclosure, a method is provided for use by a computing device, comprising: receiving a bulk request for namespace information, the bulk request being a Non-Volatile Memory Express (NVMe) command that contains a Controller and Namespace Structure (CNS) code, the CNS code being arranged to indicate that the namespace information for multiple namespaces should be returned in response to the bulk request; identifying a plurality of namespaces, the plurality of namespaces being identified based on an offset value and a length value that are provided in the bulk request; transmitting a bulk request response that contains namespace descriptors for each of the plurality of namespaces.

According to aspects of the disclosure, a system is provided, comprising: a memory; and at least one processor that is operatively coupled to the memory, the at least one processor being configured to perform the operations of: receiving a bulk request for namespace information, the bulk request being a Non-Volatile Memory Express (NVMe) command that a Controller and Namespace Structure (CNS) code that signals that namespace information for multiple namespaces should be returned in response to the bulk request; identifying a plurality of namespaces based on an offset value and a length value that are provided in the bulk request; transmitting a bulk request response that contains namespace descriptors for the plurality of namespaces.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
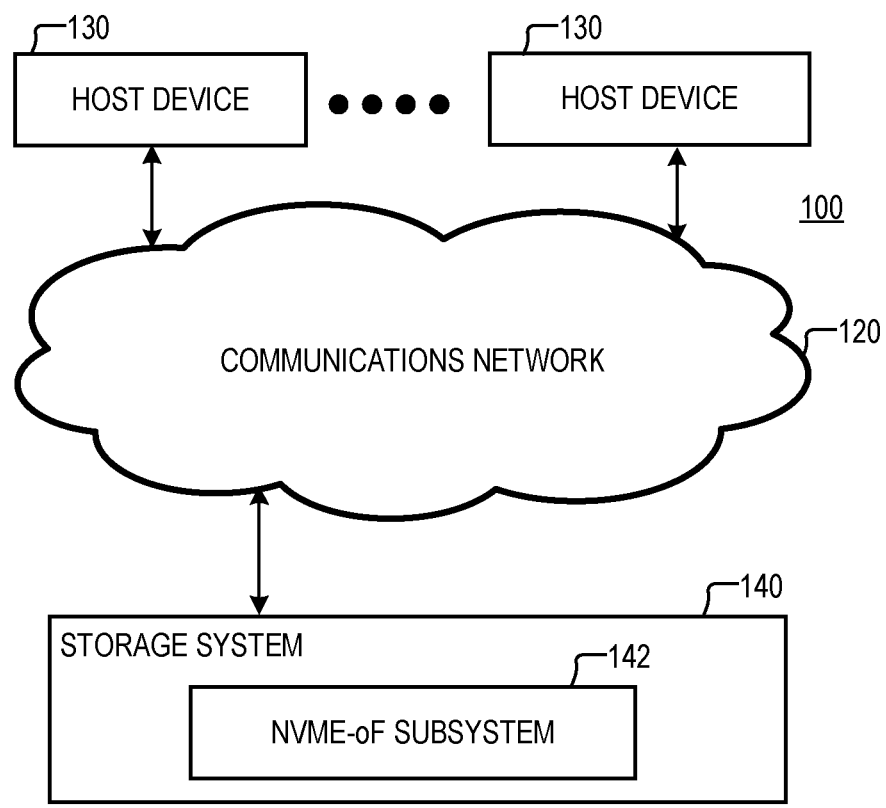
FIG. 1 is a diagram of an example of a system, according to aspects of the disclosure.

A long-haul network is a telecommunications network or data transmission infrastructure that is designed to transmit data over long distances (e.g., hundreds or thousands of kilometers). Long-haul networks are characterized by their ability to span considerable geographic distances, connecting cities, regions, countries, and continents. Long-haul networks are a crucial component of global and national communications infrastructures, enabling efficient transfer of data over extended distances.

Non-volatile memory express over TCP/IP (NVMe/TCP) is an extension of the NVMe protocol, allowing NVMe storage devices to communicate over a TCP/IP network. Customers are interested in NVMe/TCP because it uses common software and hardware enabling application servers to access the storage without having to install any special agent or adaptors. NVMe is a standard protocol included in modern operating system (OS) distributions. NVMe over fabric (NVMe-oF) subsystems (analogous to an SCSI target) present themselves as a collection of NVMe controllers, with each controller having a set of TCP connections associated with admin and IO queues (TCP association). Each TCP connection corresponds to a single queue with request/response entries. Usual implementations consist of host and NVMe targets residing in the same subnet (e.g., inside a data center). However, nothing can preclude connecting to an NVMe target over the Internet (or another long-haul network) or even into a cloud.

Long-haul networks however bring their own challenges (e.g., high latency and possible loops along the route to the destination) to using NVMe over TCP. TCP session handling concerns aside, the impact that high latency can have on an Upper Layer Protocol (ULP) (e.g., NVMe-oF) is widely known and causes end users to suffer from long connection times. These long connection times have historically made NVMe over long-haul networks unattractive. Some experts have even said that the NVMe over TCP protocol specification is not meant to be supported over high-latency networks. In a nutshell, the present disclosure presents techniques that make it practical to use NVMe/TCP to access remote storage, thus enabling NVMe over TCP to be able to access data over long-haul networks, such as the Internet and on the cloud. The present techniques are advantageous over conventional techniques because they reduce the connection times for NVMe/TCP namespaces. The term "connection time for a namespace" refers to how long it takes to create a block device and/or mount a volume that is associated with the namespace, since an initial attempt to mount the volume (and/or since an event is generated that causes the device generation/volume mounting process to begin).

As used throughout the disclosure, the term "volume" may refer to any suitable type of data volume, such as a raw storage volume or a file system volume. As used herein, the term "namespace" refers to logical abstraction representing the storage space used to implement a particular data volume. As used herein, the term "namespace descriptor" refers to any suitable type of information that represents, or otherwise identifies, at least a portion of the namespace of a volume. Examples of namespace descriptors include the information returned in response to an NVMe Identify CMS-3 command.

Figure 8:
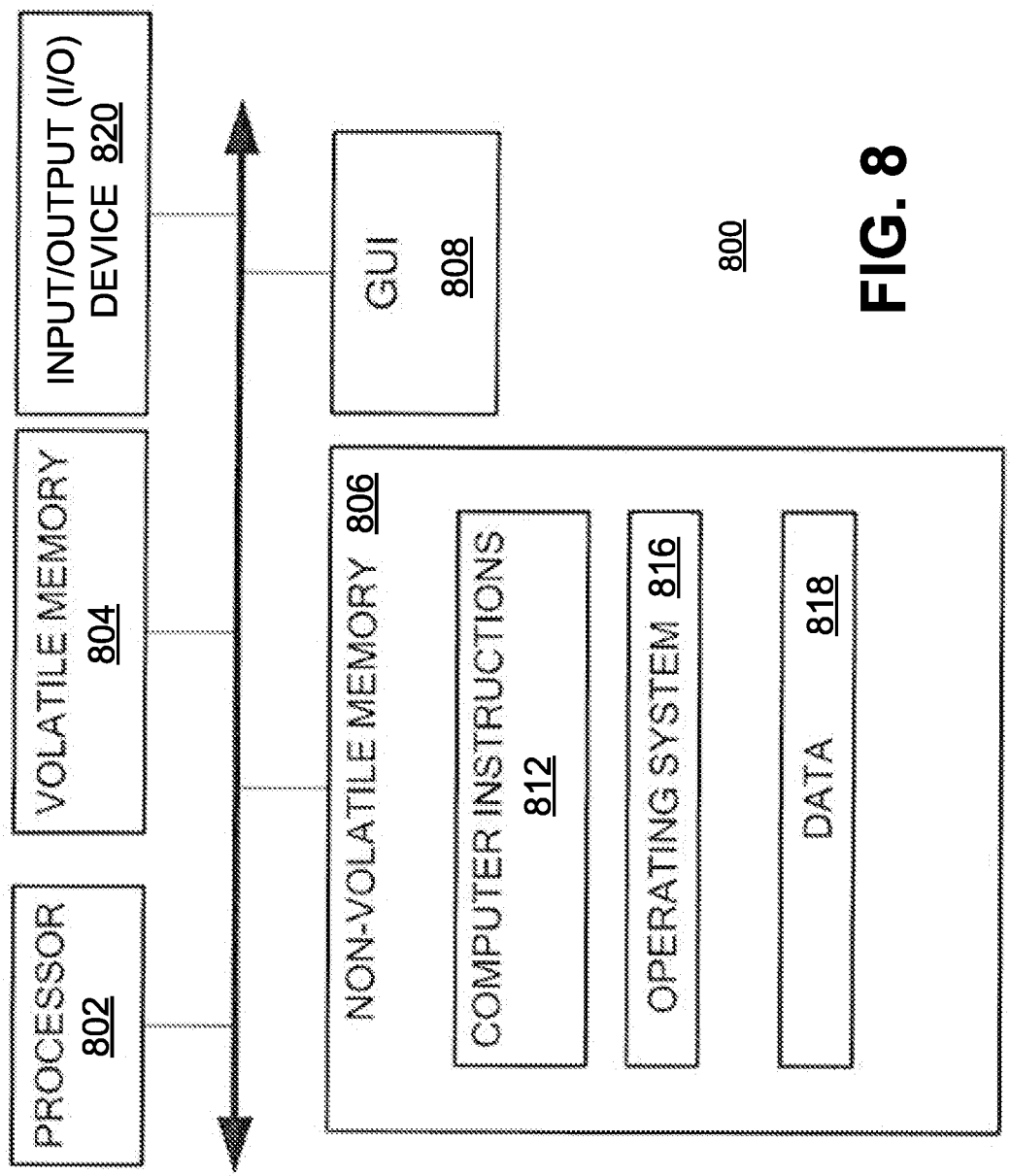
FIG. 8 is a diagram of an example of a computing device, according to aspects of the disclosure.

FIG. 1 is a diagram of an example of a system 100, according to aspects of the disclosure. As illustrated, system 100 may include a storage system 140, a communications network 120, and a plurality of host devices 130. The storage system 140 may include a plurality of storage processors, which are also referred to as "NVMe controllers", (not shown) and a plurality of storage devices (not shown). Each of the storage processors may include a computing device that is configured to receive I/O requests from any of the host devices 130 and execute the received I/O requests by reading or writing data to the storage devices. In some implementations, each of the storage processors may have an architecture that is the same or similar to the architecture of the computing device 800, which is shown in FIG. 8. In some implementations, each of the storage devices may be a non-volatile memory express (NVMe device). The storage devices and storage processors may implement an NVMe-OF subsystem 142. The communications network 120 may include the Internet, a local-area network (LAN), a wide area network (WAN), a wireless network, and/or any other suitable type of network. According to the present example, communications network 120 is a TCP/IP-based long-haul network. However, the present disclosure is not limited thereto. Each of the host devices 130 may include a desktop computer, a laptop, a smartphone, an internet-of-things device, and/or any other suitable type of device that has network connectivity. In some implementations, each of the host devices 130 may have the same architecture as the computing device 800, which is discussed further below with respect to FIG. 8.

Figure 2:
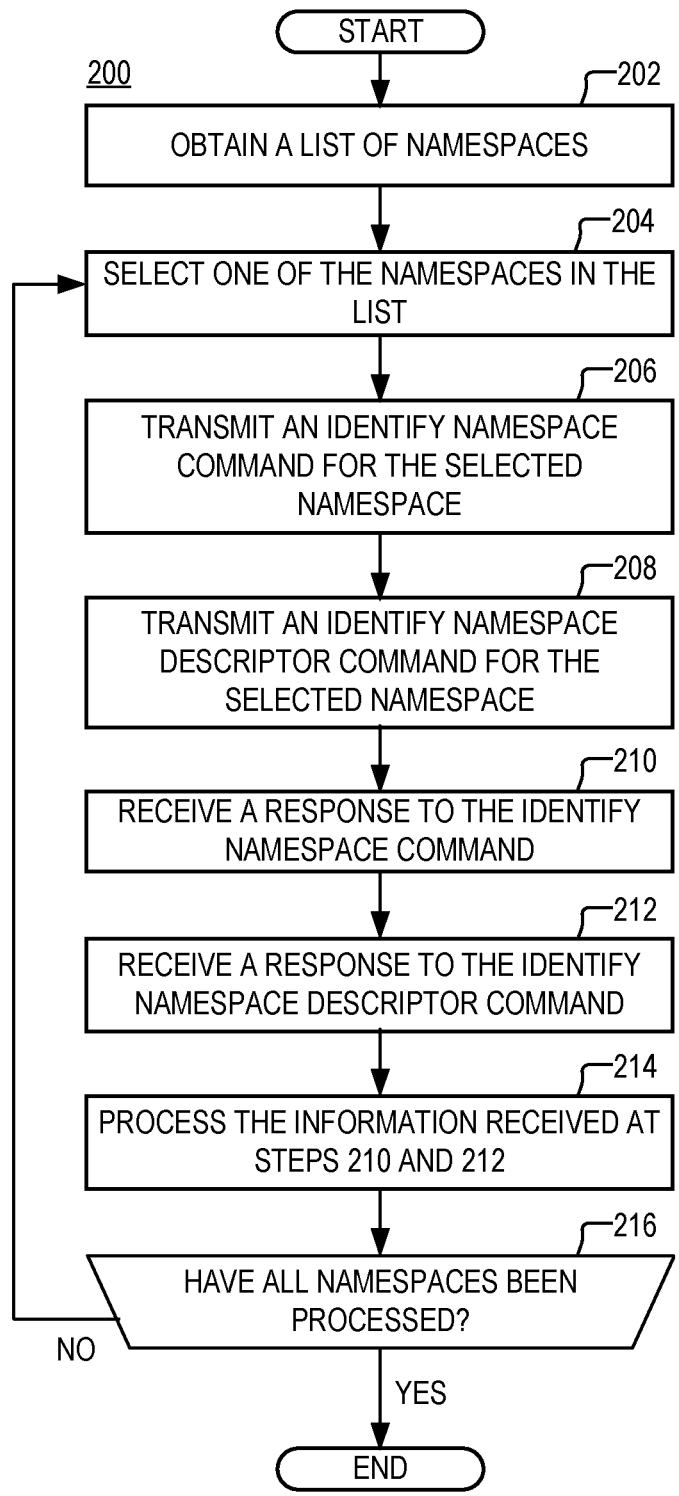
FIG. 2 is a flowchart of a process, according to the prior art.

FIG. 2 is a diagram of an example of a process 200, according to the prior art. Process 200 illustrates the conventional approach for obtaining namespace and other information for data volumes that are implemented by subsystem 142. According to the present example, process 200 is executed by one of host devices 130. However, the present disclosure is not limited to any specific entity executing process 200. At step 202, a list is obtained of a plurality of active namespaces that are implemented in storage system 140. At step 204 one of the plurality of namespaces is selected. At step 206, an identify namespace command for the selected namespace is transmitted to storage system 140. According to the present example, the identify namespace command is an identify CNS-0 command. At step 208, an identify namespace descriptor command for the selected namespace is transmitted to storage system 140. According to the present example, the identify namespace descriptor command is an identify CNS-3 command. In some implementations, At step 210, a response to the identify namespace command is received. The response includes information about the selected namespace associated with the NVMe controller. The information may include volume size, current utilization level, features such as thin or thick provisioned, LBA size in bytes, protection capabilities and modes such as write-protection, atomic operation sizes, etc.

At step 212, a response to the identify namespace descriptor command is received. The response includes a namespace descriptor (or a list of Namespace Identification Descriptor structures) corresponding to the namespace (selected at step 204). At step 214, the information received at steps 210 and 212 is processed. Processing the information may include creating a block device based on the namespace descriptor, mounting a volume based on the namespace descriptor, and/or performing any other suitable action. At step 216, a determination is made if all volumes in the set have been processed. If all volumes in the set have been processed, process 200 ends. Otherwise, process 200 returns to step 204, and another volume is selected that has not been selected during an earlier iteration of process 200. The acronym CNS stands for "Controller or Namespace Structure". CNS represents a set of features related to retrieving information about an NVMe controller and associated NVMe namespaces, such as capabilities and status.

Figure 3:
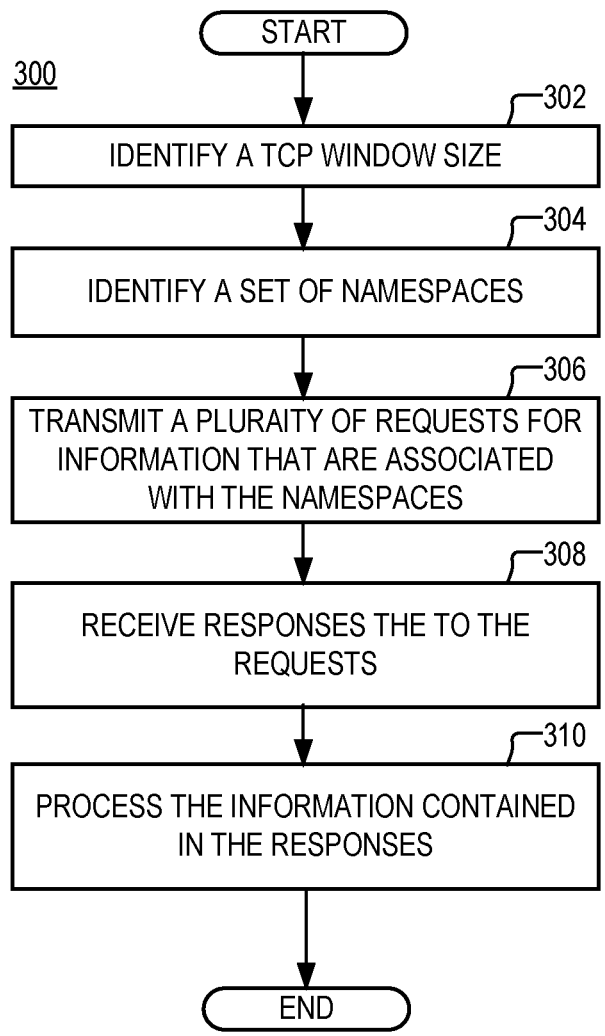
FIG. 3 is a flowchart of an example of a process, according to aspects of the disclosure.

FIG. 3 is a diagram of an example of a process 300, according to the present disclosure. Process 300 illustrates an approach for obtaining namespace information for data volumes that are implemented in storage system 140. Process 300 may be performed by one of host devices 130 and/or any other suitable computing device.

At step 302, a TCP window size is identified. The TCP window specifies the maximum amount of unacknowledged data that can be transmitted by the device executing process 300 before an acknowledgment must be received. According to the present example, the TCP window size that is determined is the total TCP window size—i.e., the maximum amount of data that can be transmitted by the device executing process 300 before an acknowledgment must be received. However, in alternative implementations, the TCP window size may be a remaining TCP window size—i.e., the actual amount of data, at the time when step 302 is executed, which can be transmitted by the device executing process 300 before an acknowledgment must be received. As can be readily appreciated, the actual amount of data may take into account that some other data (unrelated to process 300) has been transmitted by the device and is currently waiting for an acknowledgment. In some implementations, identifying the TCP window size includes retrieving form a memory an indication of the TCP window size (i.e., retrieving the value of a configuration setting that specifies (or indicates) the size of the TCP window).

At step 304, a set of namespaces is identified based on the TCP window size. Identifying the set of namespaces may include obtaining a list of active namespaces that are implemented in storage system 140 (and/or NVMe-oF subsystem 142) and selecting some or all of the namespaces in the list.

Selecting some or all of the namespaces in the list may include identifying the maximum number of namespaces whose identify namespace and identify namespace descriptor requests are permitted to be transmitted by the TCP window size (identified at step 302) before process 300 must stop and wait for an ACK. In some implementations, identifying the set of namespaces may further include selecting a (proper or improper) subset of the namespaces in the list, wherein the size of the subset is less than or equal to the maximum number of volumes whose identify namespace and identify namespace descriptor requests are permitted to be transmitted in the same TCP window (i.e. before the device executing process 300 is required to stop and wait for an ACK by the TCP windowing mechanism).

According to the present example, each volume requires two requests to be sent—i.e., an identify namespace request (e.g., an identify CNS-0 command) and an identify a namespace descriptor request (e.g., an identify CNS-3 command). Consider an example, in which the combined size of the identify namespace and identify namespace descriptor requests is M bytes and the size of the TCP window is N bytes. In this example, the maximum number X of volumes whose namespace descriptors can be requested within the TCP window can be determined by solving for X the equation of $M*X+b=N$, where b is a constant that is smaller than M (i.e., b<M). It will be understood that this example assumes that in this example, the TCP window size does not permit the sending of requests for all available namespaces during the same TCP window (i.e., before process 300 is required to stop and wait for an ACK by the TCP windowing mechanism).

Under the nomenclature of the present disclosure, the phrase "identifying as many namespaces as possible, but no more, whose information can be requested in the same TCP window" shall mean identifying a value of X that satisfies the condition of $M*X+b≤N$. In some implementations, the phrase "identifying as many namespaces as possible, but no more, whose information can be requested in the same TCP window" shall mean identifying the maximum value of X that satisfies the condition of $[(M*X+b≤N)$ && $(X≤Q)]$, where Q is the total number of namespaces that are identified in the list of active namespaces.

At step 306, a plurality of requests is transmitted that is associated with the namespaces in the set (identified at step 304). The plurality of requests may include a different identify namespace request (e.g., an identify CNS-0 command) for each of the namespaces in the set (identified at step 304). The plurality of requests may further include a different identify namespace descriptor request for (e.g., an identify CNS-3 command) of each of the namespaces in the set (identified at step 304). According to the present example, the plurality of requests is transmitted without waiting for a response to any of the requests. Because the combined size of the plurality of requests is less than or equal to the TCP window size (determined at step 302), this ensures that all requests in the plurality will be transmitted right away (i.e., without pausing until an ACK is received for any of the requests). The transmission may be performed by software (or a software routine) that is running in user space over TCP sockets.

At step 308, a plurality of responses to the requests (transmitted at step 306) is received. The plurality of responses includes a different respective response to each of the plurality of requests transmitted at step 308. The plurality of responses includes a different namespace descriptor for each of the namespaces in the set (returned in response to the identify CNS-3 command for the namespace) and information associated with the namespace's controller (returned in response to the identify CNS-0 command for the namespaces).

At step 310, at least some of the information obtained at step 308 is processed. Processing the information may include, creating a different block device based on each namespace descriptor (and/or associated controller information). Additionally or alternatively, processing the information may include mounting a different volume based on each namespace descriptor (and/or associated controller information). The present disclosure is not limited to any specific way of processing the information received at step 308.

According to the present disclosure, to test the performance of process 300, a setup was created for a test scenario of two RedHat™ Linux machines, one serving as an NVMe host, and the other serving as an NVMe target (with Dell™ software installed). A 150-millisecond round trip time was measured between the host and the NVMe target residing in two different geographical locations connected over the Internet. One hundred (100) data volumes were configured to be presented as namespaces via NVMe over TCP. The conventional approach (using RedHat host kernel NVMe driver to perform process 200) was measured to take about 60 seconds for the connection to be fully established and for all namespace information to be fully received at the host.

In the test, process 300 was implemented in an NVMe over TCP initiator, residing in user space, as an application over TCP sockets. Given the 100-volume setup, the NVMe target admin queue size was set to 200, rather than the default value of 32. As part of the NVMe connection establishment process, the NVMe target advertised a list of all namespaces (mapped-to-the-host volumes). After receiving a response to an identify namespace active list command, for each reported namespace, the initiator was used to send 100 pairs of CNS-3 and CNS-0 commands to saturate the admin queue on the target. As noted above, the initiator did not send one command at a time waiting for a reply and NVMe status of this command, as the conventional approach that is practiced by process 200 does. The requests that contain the CNS-0 and CNS-3 commands are small packets (72 bytes without a digest), and 200 of them is just over 14 K, which can fit in an outgoing TCP buffer. Even the standard TCP window size of 64 K can easily send all the packets to the destination at once.

After the sending was completed, the initiator started to read replies at the rate they were coming. In all, using the parallel approach that is practiced by process 300 was measured to result in getting 1.6 seconds for the full connection establishment time, for 100 volumes. For comparison, as noted above, the conventional approach (practiced by process 200) was measured to take 60 seconds for the full connection establishment time, for the 100 volumes.

It is noteworthy that in the absence of latency, when configured on the same physical network, the same setup NVMe over TCP connection process (i.e., process 200) completes in a matter of single-digit seconds (e.g., 1-10 seconds), and that is why it is believed that the problem (addressed by process 300) of slow connection for NVMe/TCP in long-haul networks is overlooked. It is believed that this problem is not addressed by many, if any at all, existing NVMe solutions.

In some respects, a larger TCP window size is useful for the receiving of responses. Process 300, especially when the TCP window size is large, may require additional error handling since the device executing process 300 might receive unwanted data when some request in the middle returns an error, possibly causing the whole connection to be torn down. However, under ordinary circumstances in which the path is operating correctly, when everything is up and running, process 300 can save a lot of connection establishment time (e.g., in comparison to process 200). A simple solution for additional error handling may include abandoning all requests for which no reply is received and re-transmitting the abandoned requests.

In addition to message exchange, it also takes some time to create a respective block device for each namespace (e.g., identified at step 302) because this is how the Linux NVMe initiator works. The time to create a block device adds additional delay (in process 200), and the total time ends up being around 60 seconds. In large enterprise systems, a single host device may have to mount (or otherwise process) hundreds or even thousands of data volumes. In this regard, process 300 is advantageous over process 200 because it could result in the namespaces (or their namespace descriptors and/or other information) being processed faster, which in turn could result in a better customer experience.

Figure 4:
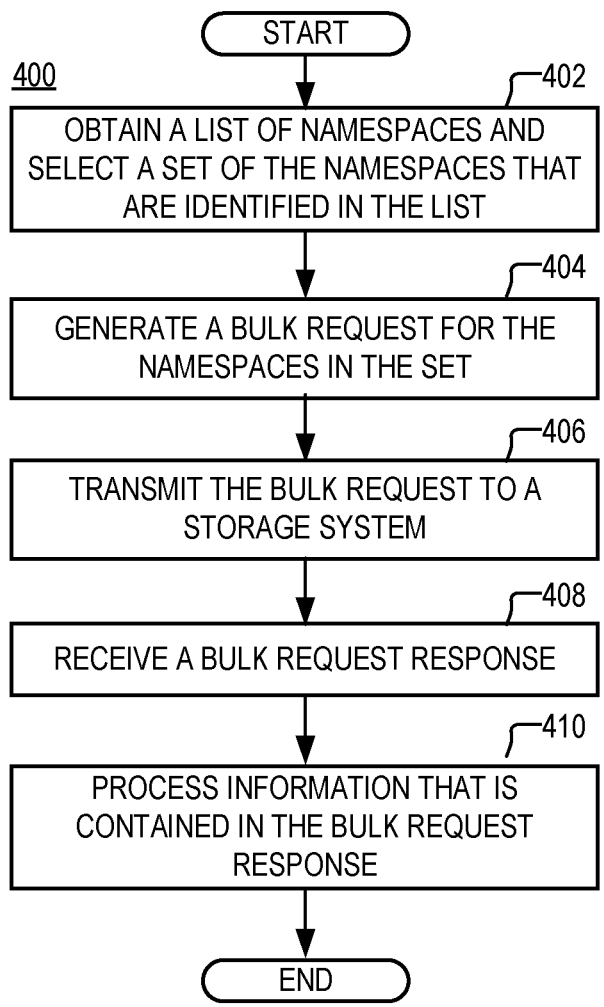
FIG. 4 is a flowchart of an example of a process, according to aspects of the disclosure.

FIG. 4 is a diagram of an example of a process 400, according to the present disclosure. Process 400 illustrates an approach for obtaining namespace information for data volumes that are implemented by subsystem 142. Process 400 may be performed by one of host devices 130 and/or any other suitable computing device. Process 400 differs from process 300 in that it sends a single bulk request for a plurality of namespace descriptors, rather than sending a different respective request for each of the plurality of descriptors.

At step 402, a list of active namespaces is obtained and a set of the namespaces that are identified in the list is selected. The list of namespaces may be implemented by storage system 140 (and/or NVMe-OF subsystem 142). In some implementations, the list may be identified by transmitting, to the storage system 140, an identify CNS-2 command, which is a Get namespace active list command that retrims a list of active namespaces that are present in storage system 140 (or subsystem 142). The set of namespaces may include some or all of the namespaces in the list.

Figure 6:
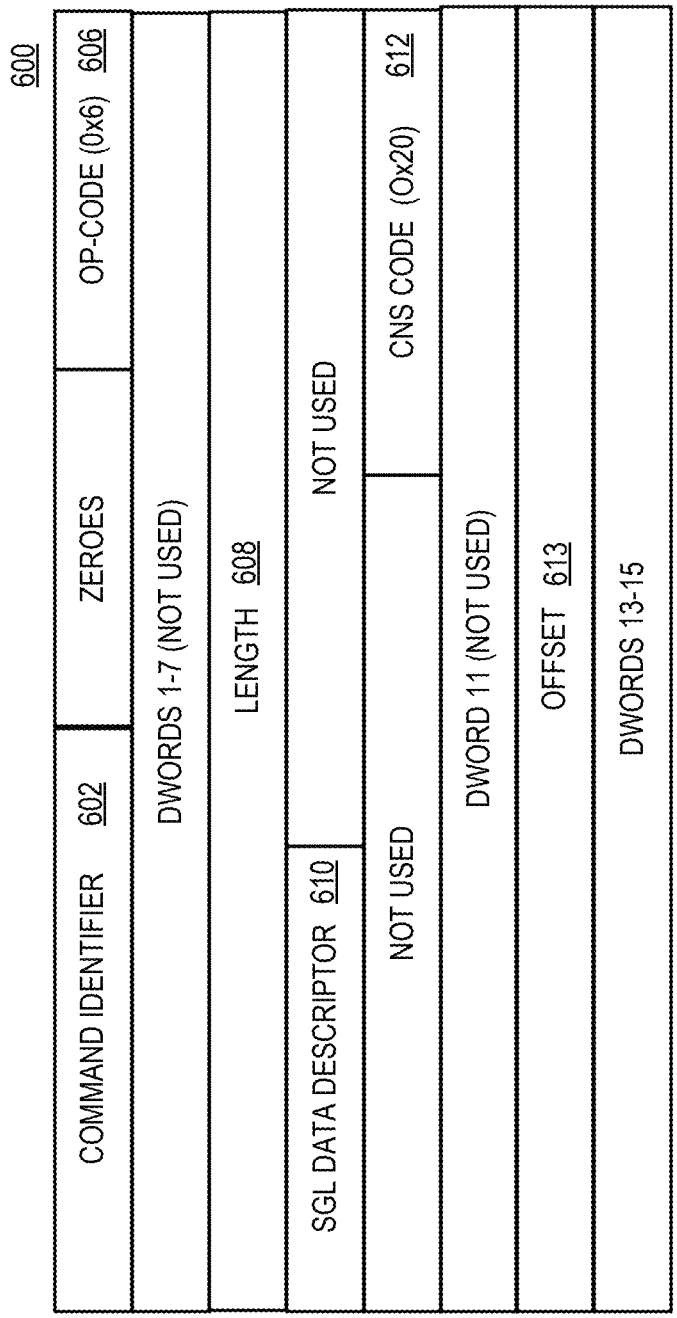
FIG. 6 is a diagram of an example of a bulk request, according to aspects of the disclosure.

At step 404, a bulk request is generated for the namespaces in the set (selected at step 402). The bulk request may be the same or similar to the bulk request 600, which is shown in FIG. 6. The bulk request identifies the set of namespaces by offset and length values, rather than by including a different respective identifier for each namespace in the set. In other words, in the bulk request, each and every namespace in the set is identified at once by the offset and length values. The identifiers of the namespaces in the set may be consecutive.

Figure 7:
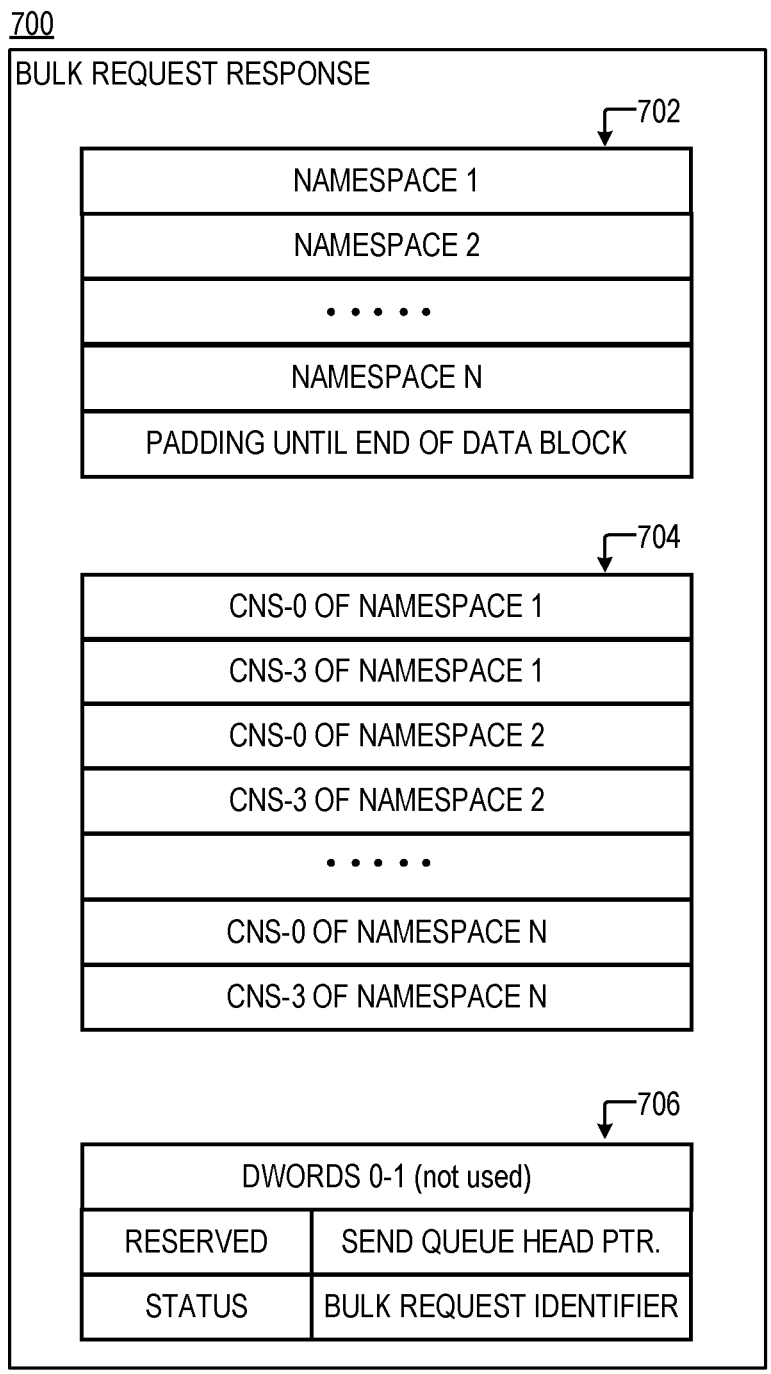
FIG. 7 is a diagram of an example of a bulk request response, according to aspects of the disclosure.

In one implementation, the offset value, which is contained in one of the fields of the bulk request, may identify the namespace having the smallest identifier out of all namespaces in the set. Additionally or alternatively, in some implementations, the offset may be the identifier of the namespace having the smallest identifier out of all namespaces in the set. The length value, which is contained in another field of the bulk request, specifies the amount of data that needs to be transmitted in response to the bulk request. According to the present example, a total of two different CNS data structures (CNS-0 and CNS-3) need to be returned, in response to the bulk request, for each of the namespaces in the set. If the set includes N namespaces and the combined size of the CNS data structures for each namespace is S, the value of the length may be at least equal to L=N*S. In some implementations, the length may take into account metadata (or additional information) that needs to be transmitted together with the request, in which case the value of L=N*S+M, where M is the size of the other metadata. The metadata may include a list of the namespaces whose respective CNS data structures are provided in the response to the bulk request (e.g., see portion 702 of bulk request response 700, which is shown in FIG. 7).

At step 406, the bulk request is transmitted to storage system 140.

At step 408, a response to the bulk request is received. The response includes a stream of protocol data units which together contain controller information and namespace descriptors for the namespaces in the set. The response may be the same or similar to the bulk request response 700, which is shown in FIG. 7. The response may include a list of namespaces followed by a different respective pair of data structures for each of the namespaces that are identified in the list. Each pair of data structures may include: (i) a CNS-0 data structure that contains controller information associated with the pair's respective namespace, and (ii) a CNS-3 data structure that contains a namespace descriptor for the pair's respective namespace.

At step 410, at least some of the information obtained at step 408 is processed. Processing the information may include creating a different block device based on each namespace descriptor (and associated controller information) that is received at step 408. Additionally or alternatively, processing the information may include mounting a different volume based on the received information. The present disclosure is not limited to any specific way of processing the information received at step 410.

In some implementations, the bulk request may be an Identify NVMe command similar to CNS-0 and CNS-3 requests. The bulk request may have a standard Identify command opcode 0x6 and it may be constructed similar way to CNS-0 or CNS-3 commands (see the discussion of FIG. 6 below). The length value that is contained in the bulk request may be calculated by assigning 4096 for a list of namespaces and 8 K for each namespace in the list, 4096 for each CNS-0 data structure, and 4096 for each CNS-3 data structure. In this regard, the total length value is 4096+8192 times the number of namespaces reported by the NVMe target. If the total number of namespaces reported by the target exceeds 1000, then the length value will cap at a maximum of 4096+8192*1000, and subsequent identify namespaces bulk command will be sent with an offset of 1000 (or multiples of 1000) in DWORD-12. The command may have a different (e.g., new) CNS value of 0x20. The bulk request response (received at step 408) can contain information on up to 1000 namespaces, as for namespace lists larger than 1000 volumes, multiple bulk requests may need to be transmitted. The offset value in each of the requests may be incremented by 1000.

Figure 5:
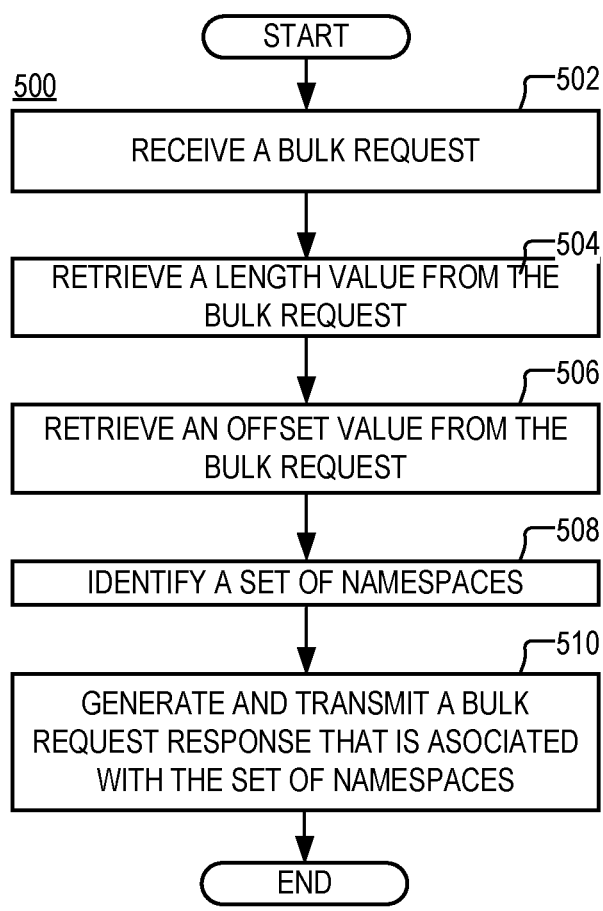
FIG. 5 is a flowchart of an example of a process, according to aspects of the disclosure.

FIG. 5 is a flowchart of an example of a process 500, according to aspects of the disclosure. According to the present example, process 500 is performed by one or more computing devices that implement the NVMe-OF subsystem 142 of storage system 140. However, the present disclosure is not limited to any specific entity executing process 500.

At step 502, a bulk request is received for a set of namespaces. The bulk request may be the same or similar to the request generated at step 404 of process 400. The namespaces in the set may be implemented by storage system 140 (and/or NVMe-OF subsystem 142).

At step 504, a length value is retrieved from the bulk request.

At step 506, an offset value is retrieved from the request.

At step 508, a set of namespaces is identified. The set of namespaces may be a subset (proper or improper) or all namespaces that are currently active in storage system 140 and/or subsystem 142. The set of namespaces may include namespaces having identifiers that can be ordered in a sequence (e.g., identifiers that are consecutive, etc.). The identifier of the namespace having the smallest identifier (i.e., the first namespace in the sequence) may be indicated by the offset value. The namespaces that follow may be identified based on the length value. The count of namespaces may be identified by identifying a total count N of namespaces in the set and subtracting one from the count (N−1). Afterwards, N−1 namespaces may be identified which have consecutive identifiers that follow the identifier of the first namespace (i.e., the identifier specified by the offset). The total count of namespaces in the set may be identified based on the length value that is specified in the bulk request and the size of the namespace descriptor(s) for each value. As noted above, in one example, the number of namespaces may be determined based on the equation of $N=(L-M)/S$, where N is the number of namespaces in the set, L is the length value that is contained in the bulk request, M is the size of metadata that needs to be transmitted with the response to the bulk request, and S is the combined size of the CNS data structures for each namespace, which need to be transmitted, as part of the bulk request response. The size of data M in one example may be the size of a namespace list that needs to be sent at the beginning of the bulk request response (e.g., see portion 702 of bulk request response 700, which is shown in FIG. 7).

At step 510, a bulk request response is generated and transmitted. The bulk request response may be the same or similar to the bulk request response 700, which is discussed further below with respect to FIG. 7. The bulk request response may include a first portion, a second portion, and a third portion. The combined size of the first and second portions is equal to (or otherwise based on) the length value specified in the bulk request (received at step 502). In some implementations, the first and second portions may be transmitted as a Controller-To-Host Data split into chunks of Maximum Data Transfer Size and sent as NVMe over TCP PDUs. 706 may be part of it or sent separately as a NVMe over TCP Capsule Response PDU. All of those PDUs are sent as a TCP data stream. The first portion may include a list of namespace descriptors. The list of namespace descriptors may include a different respective identifier for each of the namespaces that are identified at step 508. The second portion may include a plurality of data structures. The plurality of data structures may include one or more different data structures for each of the namespaces that are identified in the list. According to the present example, the plurality of data structure includes a different respective CNS-0 data structure and a different respective CNS-3 data structure for each of the namespaces in the list. The third portion may include a standard NVMe/TCP capsule response packet. If the operation cannot be completed or supported by storage system 140 and/or NVMe-OF subsystem 142, the capsule response packet may indicate an appropriate error that has occurred or an invalid operation error code. On the other hand, if the operation could be completed successfully, the capsule response packet may include an indication to this effect. In some implementations, when an error or invalid operation error code is generated, the second portion of the bulk request response may be omitted from the response. In such implementations, the data stream may include an empty namespace descriptor list followed by the capsule response packet. The term "CNS-0 data structure" may refer to any data structure that contains, at least in part, information that is returned in response to a conventional (i.e., non-bulk) Identify CNS-0 command. The term "CNS-3 data structure" may refer to any data structure that contains, at least in part, information that is returned in response to a conventional (i.e., non-bulk) Identify CNS-3 command.

FIG. 6 is a diagram of an example of a bulk request 600, according to aspects of the disclosure. As illustrated, the bulk request 600 may include a command identifier field 602 that is padded with zeroes and followed by an opcode field 606. In addition, the bulk request 600 includes a length field 608, which specifies a length value, a scatter-gather-list (SGL) data descriptor field 610 which includes an SGL data descriptor for the bulk request 600, and a CNS code field 612. And still furthermore, the bulk request 600 may include an offset field 613, which contains the offset value for the bulk request 600. According to the present example, the bulk request 600 is a standard NVMe/TCP Initiate command. As such, the op-code of the bulk request 600 (contained in field 606) is '0x'6', which is the standard opcode for Initiate NVMe commands. However, the CNS code of the bulk request (contained in field 612) is specific to the bulk request, and it is different from the CNS codes used in conventional NVMe Initiate commands that request a single namespace descriptor. According to the present example, the CNS code is '0x20', which code is different from the codes used in conventional (i.e., non-bulk) CNS requests. In the present example, DWORDS 1-7, 11, and 13-15 are not used and DWORD-12 is used to contain the offset, while DWORD 8 is used to contain the length value. Although in the example of FIGS. 4-5, the Transport Control Protocol is used as the transport layer for the transmission of bulk requests, it will be understood that the present disclosure is not limited to using any specific type of transport protocol (or transport layer) for the transmission of bulk requests.

FIG. 7 is a diagram of an example of a bulk request response 700. The bulk request response may be generated in response to a bulk request (hereinafter "triggering bulk request"), such as the bulk request 600. According to the present example, the bulk request response includes portions 702, 704, and 706. Portion 702 includes a list of namespaces. Portion 704 includes a plurality of namespace data structures. And portion 706 is a standard NVMe/TCP capsule response packet. Portion 702 includes a list of all namespaces whose namespace information is provided in portion 704. The list may be padded with zero to fit the list size to a value that is factored into the length field of the triggering bulk request (e.g., 4096K or M). Portion 704 may include a respective CNS-0 and CNS-3 data structure for each of the namespaces that are identified in the list. The CNS-0 and CNS-3 data structures for any of the volumes may contain a namespace description for the volume and information corresponding to a controller that is associated with the volume. The standard NVMe/TCP response packet may contain an indication of whether the triggering bulk request was executed successfully. If the triggering bulk request was executed successfully, the bulk request response 700 would include the requested information in portion 704. If the triggering request could not be executed successfully, portion 704 may be omitted from the bulk request response 700, and the NVMe/TCP response packet in portion 706 may contain an indication that the triggering bulk request could not be executed successfully.

Referring to FIG. 8, in some embodiments, a computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

FIGS. 1-8 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use by a computing device, comprising:
receiving a bulk request for namespace information, the bulk request being a Non-Volatile Memory Express (NVMe) command that contains a Controller and Namespace Structure (CNS) code, the CNS code being arranged to indicate that the namespace information for multiple namespaces should be returned in response to the bulk request;
identifying a plurality of namespaces starting at an offset value that is provided in the bulk request, wherein identifying the plurality of namespaces includes identifying a count of namespaces in the plurality, the count being identified based on a length value that is contained in the bulk request, a size of a namespace list, and a combined size of CNS data structures for the namespaces;
transmitting a bulk request response that contains the namespace list and the CNS data structures for the namespaces,
wherein the bulk request uses the offset and length values to identify the plurality of namespaces, instead of using a different respective identifier for each of the plurality of namespaces.

2. The method of claim 1, wherein the request is an Identify NVMe command.

3. The method of claim 1, wherein identifying the plurality of namespaces further includes identifying a first namespace identifier based on the offset value and a plurality of second namespace identifiers that follow the first namespace identifier, the plurality of second namespace identifiers being identified based on the length value.

4. The method of claim 1, wherein the bulk request is received over a long-haul communications network.

5. The method of claim 1, wherein the bulk request response includes controller information for each of the plurality of namespaces.

6. The method of claim 1, wherein the bulk request response includes: (i) a different respective CNS-0 data structure for each of the plurality of namespaces, and (ii) a different respective CNS-3 data structure for each of the plurality of namespaces.

7. A system, comprising:
a memory; and
at least one processor that is operatively coupled to the memory, the at least one processor being configured to perform the operations of:
receiving a bulk request for namespace information, the bulk request being a Non-Volatile Memory Express (NVMe) command that contains a Controller and Namespace Structure (CNS) code that signals that namespace information for multiple namespaces should be returned in response to the bulk request;
identifying a plurality of namespaces starting at an offset value that is provided in the bulk request, wherein identifying the plurality of namespaces includes identifying a count of namespaces in the plurality, the count being identified based on a length value that is contained in the bulk request, a size of namespace list, and a combined size of ONS data structures for the namespaces;
transmitting a bulk request response that contains the namespace list and the CNS data structures for the namespace,
wherein the bulk request uses the offset and length values to identify the plurality of namespaces, instead of using a different respective identifier for each of the plurality of namespaces.

8. The system of claim 7, wherein the request is an Identify NVMe command.

9. The system of claim 7, wherein identifying the plurality of namespaces further includes identifying a first namespace identifier based on the offset value and a plurality of second namespace identifiers that follow the first namespace identifier, the plurality of second namespace identifiers being identified based on the length value.

10. The system of claim 7, wherein the bulk request is received over a long-haul communications network.

11. The system of claim 7, wherein the bulk request response includes: (i) a different respective CNS-0 data structure for each of the plurality of namespaces, and (ii) a different respective CNS-3 data structure for each of the plurality of namespaces.

* * * * *